United States Patent
Yabunouchi et al.

(10) Patent No.: US 6,838,409 B1
(45) Date of Patent: Jan. 4, 2005

(54) CATALYST FOR OLEFIN/STYRENE COPOLYMERIZATION, AND PROCESS FOR PRODUCING OLEFIN/STYRENE COPOLYMER

(75) Inventors: Nobuhiro Yabunouchi, Ichihara (JP); Nobuhide Ishihara, Ichihara (JP); Kiyohiko Yokota, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/914,254

(22) PCT Filed: Feb. 25, 2000

(86) PCT No.: PCT/JP00/01101

§ 371 (c)(1),
(2), (4) Date: Aug. 24, 2001

(87) PCT Pub. No.: WO00/50469

PCT Pub. Date: Aug. 31, 2000

(30) Foreign Application Priority Data

Feb. 26, 1999 (JP) ............................................ 11-050668

(51) Int. Cl.⁷ ............................. B01J 31/00; B01J 37/00; C08F 4/02; C08F 4/60
(52) U.S. Cl. ....................... 502/103; 502/104; 502/113; 502/150; 502/172; 556/51
(58) Field of Search ......................................... 502/103

(56) References Cited

U.S. PATENT DOCUMENTS

| | | | | |
|---|---|---|---|---|
| 4,990,580 A | * | 2/1991 | Ishihara et al. | 526/160 |
| 5,786,432 A | * | 7/1998 | Kuber et al. | 526/127 |
| 5,854,165 A | | 12/1998 | Yabunouchi et al. | |
| 6,107,232 A | * | 8/2000 | Yokota | 502/155 |
| 6,171,994 B1 | | 1/2001 | Yabunouchi et al. | |
| 6,191,241 B1 | * | 2/2001 | Starzewski et al. | 526/161 |
| 6,242,544 B1 | * | 6/2001 | Kuber et al. | 526/127 |
| 6,255,244 B1 | * | 7/2001 | Yabunouchi | 502/80 |
| 6,271,313 B1 | * | 8/2001 | Zambelli et al. | 525/242 |
| 6,339,135 B1 | | 1/2002 | Kashiwamura et al. | |

FOREIGN PATENT DOCUMENTS

| | | | | |
|---|---|---|---|---|
| DE | WO 98/01485 A1 | * | 1/1988 | ........... C08F/10/02 |
| EP | 417 313 | | 3/1991 | |
| EP | 707 013 | | 4/1996 | |
| EP | 911 346 | | 4/1999 | |
| JP | 9-165410 | | 6/1997 | |
| JP | 9-176220 | | 7/1997 | |
| JP | 9-255711 | | 9/1997 | |
| JP | 9-278817 | | 10/1997 | |
| JP | 10-168112 | | 6/1998 | |

* cited by examiner

Primary Examiner—Mark L. Bell
(74) Attorney, Agent, or Firm—Oblon, Spivak, McClelland, Maier & Neustadt, P.C.

(57) ABSTRACT

Catalysts for copolymerization of olefins and styrenes, comprising (A) a transition metal compound, (B) an oxygen-containing compound and/or a compound capable of reacting with a transition metal compound to form an ionic complex, (C) a specific compound such as a reaction product of triphenylmethyl alcohol and triisobutylaluminium, and optionally (D) an alkylating agent, and methods for producing olefin-styrene copolymers in the presence of such catalysts, which catalysts have the advantages of enhancing the copolymerization activity and reducing the amount of the promoter such as oxygen-containing compounds, etc, and using them, olefin-styrene copolymers can be produced efficiently and inexpensively.

26 Claims, No Drawings

CATALYST FOR OLEFIN/STYRENE COPOLYMERIZATION, AND PROCESS FOR PRODUCING OLEFIN/STYRENE COPOLYMER

TECHNICAL FIELD

The present invention relates to catalysts for copolymerization of olefins and styrenes, and to methods for producing olefin-styrene copolymers. Precisely, it relates to catalysts for olefin-styrene copolymerization comprising, as one component, a specific compound, and to inexpensive and efficient methods for producing olefin-styrene copolymers with the catalysts.

BACKGROUND ART

Recently, metallocene catalysts have been developed and used for olefinic polymer production, which comprise, as the catalyst component, a transition metal compound having a n-ligand bonded to the center metal element via a group.

To exhibit satisfactory activity, however, the catalysts of that type require a large amount of promoters such as aluminoxanes and the like. Therefore, they are problematic in that the total catalyst costs are inevitably high, and, in addition, the catalyst residue resulting from the promoter used often remains in the polymers produced thereby unfavorably coloring the polymers.

In that situation, techniques of using clay, clay minerals and the like along with the catalysts have been proposed so as to reduce the amount of the promoters to be used along with them (Japanese Patent Laid-Open Nos. 301917/1993, 136047/1994, 164510/1997, 009206/1989, etc.).

At present, however, even these techniques could not as yet provide catalysts having satisfactorily high activity.

The present invention is to provide catalysts for olefin-styrene copolymerization capable of efficiently and inexpensively producing olefin-styrene copolymers, and to provide methods for producing olefin-styrene copolymers.

DISCLOSURE OF THE INVENTION

We, the present inventors have assiduously studied so as to attain the object as above, and, as a result, have found that copolymerization catalysts containing, as one component, a specific compound have improved copolymerization activity and therefore the amount of the promoters such as oxygen-containing compounds and others to be used with them can be reduced. On the basis of this finding, we have completed the present invention.

The invention is to provide a catalyst for copolymerization of olefins and styrenes and a method for producing olefin-styrene copolymers, which are as follows:

1. A catalyst for copolymerization of olefins and styrenes, which comprises:
   (A) a transition metal compound,
   (B) an oxygen-containing compound,
   (C) a compound of a general formula (1):

   (1)

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, a an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, $R^1$'s may be the same or different, and $R^1$'s may be optionally bonded to each other to form a cyclic structure; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m-1), and optionally,
   (D) an alkylating agent.

2. A catalyst for copolymerization of olefins and styrenes, which comprises:
   (A) a transition metal compound,
   (C) a compound of a general formula (1):

   (1)

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, $R^1$'s may be the same or different, and $R^1$'s may be optionally bonded to each other to form a cyclic structure; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m-1), and optionally,
   (D) an alkylating agent.

3. The catalyst of above 1 or 2 for copolymerization of olefins and styrenes, wherein, in (C), X is carbon, Y is oxygen and Z is aluminium.

4. The catalyst of above 1 or 2 for copolymerization of olefins and styrenes, wherein the compound (C) is a reaction product of <1>at least one selected from compounds of a general formula, $(R^1)_3$—C—$OR^3$, $R^4$—CO—$R^5$ or $R^6$—CO—$OR^7$, with <2>a compound of a general formula, $Z(R^2)m$. (In these formulae, $R^1$, $R^3$, $R^4$, $R^5$, $R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and $R^1$, $R^3$, $R^1$, $R^5$, $R^6$ and $R^7$ may be the same or different, and $R^1$,$R^3$, $R^4$, $R^5$, $R^6$ and $R^7$ may be optionally bonded to each other to form a cyclic structure; Z represents a metal element of Groups 2 to 13; m is an integer, indicating the valency of the metal element Z; and $R^2$ represents a hydrocarbon group.)

5. A catalyst for copolymerization of olefins and styrenes, which comprises:
   (A) a transition metal compound,
   (B) an oxygen-containing compound, and/or a compound capable of reacting with a transition metal compound to form an ionic complex, (C1) at least one selected from compounds of a general formula, $(R^1)_3$—C—$OR^3$, $R^4$—CO—$R^5$ or $R^6$—CO—$OR^7$ (In these formulae, $R^1, R^3, R^4, R^5, R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group, having from 6 to 30 carbon atoms, an amino group, an amido group, or a carboxyl group, and $R^1, R^3, R^4, R^5, R^6$ and $R^7$ may be the same or different, and $R^1, R^3, R^4, R^5, R^6$ and $R^7$ may be optionally bonded to each other to form a cyclic structure.)

(C2) a compound of a general formula, $Z(R^2)_m$. (In this formula; Z represents a metal element of Groups 2 to 13; m is an integer, indicating the valency of the metal element Z; and $R^2$ represents a hydrocarbon group.), and optionally, (D) an alkylating agent.

6. A catalyst for copolymerization of olefins and styrenes, which comprises:

(A) a transition metal compound, (C1) at least one selected from compounds of a general formula, $(R^1)_3$—C—$OR^3$, $R^4$—CO—$R^5$ or $R^6$—CO—$OR^7$ (In these formulae, $R^1, R^3, R^4, R^5, R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and $R^1, R^3, R^4, R^5, R^6$ and $R^7$ may be the same or different, and $R^1, R^3, R^4, R^5, R^6$ and $R^7$ may be optionally bonded to each other to form a cyclic structure.

(C2) a compound of a general formula, $Z(R^2)m$, wherein Z represents a metal element of Groups 2 to 13; m is an integer, indicating the valency of the metal element Z; and $R^2$ represents a hydrocarbon group, and optionally, (D) an alkylating agent.

7. The catalyst of any of above 1 to 6 for copolymerization of olefins and styrenes, wherein at least one of three $R^1$'s is an aromatic hydrocarbon group having from 6 to 30 carbon atoms.

8. The catalyst of any of above 1 to 6 for copolymerization of olefins and styrenes, wherein three $R^1$'s are all aromatic hydrocarbon groups each having from 6 to 30 carbon atoms.

9. The catalyst of any of above 1 to 6 for copolymerization of olefins and styrenes, wherein three $R^1$'s are all phenyl groups.

10. The catalyst of any of above 1 to 9 for copolymerization of olefins and styrenes, wherein $R^2$ is an alkyl group having at least 2 carbon atoms.

11. The catalyst of any of above 4 to 10 for copolymerization of olefins and styrenes, wherein Z is aluminium.

12. The catalyst of any of above 1 to 11 for copolymerization of olefins and styrenes, wherein the transition metal compound (A) is represented by any of the following general formulae (2) to (6):

$$Q^1{}_a(C_5H_{5-a-b}R^8{}_b)(C_5H_{5-a-c}R^9{}_c)M^1X^1Y^1 \quad (2)$$

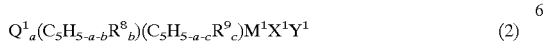

$$Q^2{}_a(C_5H_{5-a-d}R^{10}{}_d)Z^1M^1X^1Y^1 \quad (3)$$

$$(C_5H_{5-e}R^{11}{}_e)M^1X^1Y^1W^1 \quad (4)$$

$$M^1X^1Y^1W^1U^1 \quad (5)$$

$$L^1L^2M^2X^1Y^1 \quad (6)$$

in which $Q^1$ represents a bonding group that crosslinks the two conjugated five-membered cyclic ligands ($C_5H_{5-a-b}R^{10}{}_b$) and ($C_5H_{5-a-c}R^9{}_c$); $Q^2$ represents a bonding group that crosslinks the conjugated five-membered cyclic ligand ($C_5H_{5-a-d}R^{10}{}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1Z^1$, $W^1$ and $U^1$ may be bonded to each other to form a cyclic structure.

13. The catalyst of above 12 for copolymerization of olefins and styrenes, wherein, in the transition metal compound (A) of formula (4), the group ($C_5H_{5-e}R^{11}{}_e$) is represented by any of the following general formulae (I) to (VII):

(I)

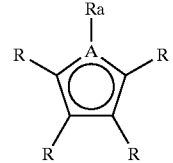

(II)

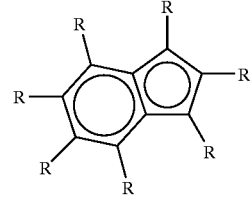

(III)

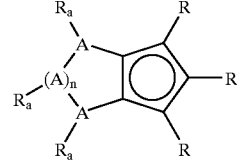

(IV)

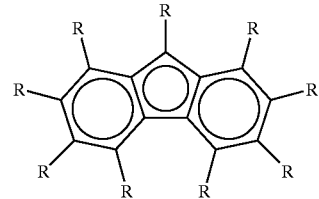

-continued

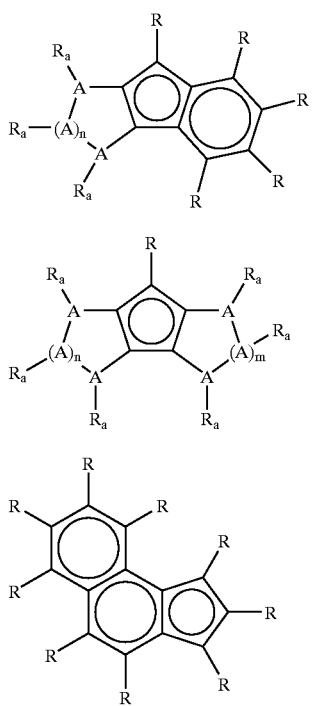

(V)

(VI)

(VII)

wherein A represents an element of Group 13, 14, 15 or 16, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

14. A method for producing olefin-styrene copolymers, which comprises copolymerizing olefins and styrenes in the presence of the copolymerization catalyst of any of above 1 to 13.

BEST MODES OF CARRYING OUT THE INVENTION

The invention is described below with reference to its embodiments.

I. Catalyst for copolymerization of olefins and styrenes:
1. Components of catalyst for copolymerization of olefins and styrenes:

The catalyst of the invention for copolymerization of olefins and styrenes comprises (A) a transition metal compound, (B) an oxygen-containing compound and/or a compound capable of reacting with a transition metal compound to form an ionic complex, and (C) a compound of formula (1) which will be described in detail hereinunder, and optionally (D) an alkylating agent. The constituent components are described below.

(A) Transition Metal Compound:

Various types of transition metal compounds are usable as the component (A) in the invention, but preferred are transition metal compounds of Groups 4 to 6 of the Periodic Table, or transition metal compounds of Groups 8 to 10 thereof. As the transition metal compounds of Groups 4 to 6 of the Periodic Table, preferred are those of the following general formulae (2) to (5). As the transition metal compounds of Groups 8 to 10 of the Periodic Table, preferred are those of the following general formula (6).

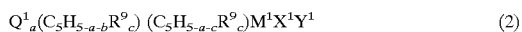 (2)

 (3)

 (4)

 (5)

 (6)

wherein $Q^1$ represents a bonding group that crosslinks the two conjugated five-membered cyclic ligands ($C_5H_{5a-b}R^8_b$) and ($C_5H_{5a-c}R^9_c$); $Q^2$ represents a bonding group that crosslinks the conjugated five-membered cyclic ligand ($C_5H_{5-a-d}R^{10}_d$) and the group $Z^1$; $R^6$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 4 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $Z^1$, $W^1$ and $U^1$ may be bonded to each other to form a cyclic structure.

Specific examples of $Q^1$ and $Q^2$ in formulae (2) and (3) include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such as a $(CH_3)_2Ge$ group, a $(C_6H_5)_2Ge$ group, a $(CH_3)P$ group, a $(C_6H_5)P$ group, a $(C_4H_9)N$ group, a $(C6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups.

$(C_5H_{5-a-b}R^8_b)$, $(C_5H_{5-a-c}R^9_c)$ and $(C_5H_{5-a-d}R^{10}_d)$ are conjugated, 5-membered cyclic ligands, in which $R^8$, $R^9$ and $R^{10}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a 0, or an integer of from 0 to 4 when a=1, or an integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of —Si ($R^{12}$) ($R^{13}$) ($R^{14}$), in which $R^{12}$, $R^{13}$ and $R^{14}$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of —P($R^{15}$) ($R^{16}$), —N($R^{15}$) ($R^{16}$), and —B($R^{15}$) ($R^{16}$), respectively, in which $R^{15}$ and $R^{16}$ each represent a hydrocarbon group having from 1 to 18 carbon atoms. Plural $R^8$'s, $R^9$'s and $R^{10}$'s, if any, may be the same or different ones, respectively. In formula (1–2), the conjugated, 5-membered cyclic ligands ($C_5H_{5-a-b}R^8_b$) and ($C_5H_{5-a-c}R^9_c$) may be the same or different ones.

$M^1$ represents a transition metal element of Groups 4 to 6 of the Periodic Table, including, for example, titanium, zirconium, hafnium, niobium, molybdenum, tungsten, etc. Of those, preferred are titanium, zirconium and hafnium, and more preferred is zirconium. $Z^1$ represents a covalent-bonding ligand, including, for example, oxygen (—O—), sulfur (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms. $X^1$ and $Y^1$ each represent a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different, and they may be bonded to each other to form a cyclic structure.

In formula (4), $M^1$ represents a transition metal of Groups 4 to 6 of the Periodic Table, such as that mentioned above; and $X^1$ and $Y^1$ have the same meanings as above. The meanings of $X^1$ and $Y^1$ shall apply to $W^1$. Namely, $W^1$ is a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$, $Y^1$ and $W^1$ may be the same or different, and they may be bonded to each other to form a cyclic structure.

In formula (5), $M^1$ represents a transition metal of Groups 4 to 6 of the Periodic Table, such as that mentioned above; and $X^1$, $Y^1$ and $W^1$ have the same meanings as above. The meanings of $X^1$, $Y^1$ and $W^1$ shall apply to $U^1$. Namely, $U^1$ is a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$, $Y^1$, $W^1$ and $U^1$ may be the same or different, and they may be bonded to each other to form a cyclic structure.

(I) As specific examples of the transition metal compounds of formulae (2) and (3), mentioned are the following compounds. In the compounds to be mentioned below, titanium may be replaced with zirconium, and such zirconium compounds are also referred to herein to the same effect.

(1) Transition metal compounds not having a crosslinkable bonding group but having two conjugated, 5-membered cyclic ligands, such as 0.17 bis(cyclopentadienyl)titanium dichloride, bis(methylcyclopentadienyl)titanium dichloride, bis(dimethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(n-butylcyclopentadienyl)titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titanium dichloride, (cyclopentadienyl)(fluorenyl)titanium dichloride, etc.

(2) Transition metal compounds having two conjugated, 5-membered cyclic ligands, in which the two ligands are crosslinked with an alkylene group, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl) titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4-dimethylindenyl)titanium dichloride, ethylenebis(2-methyl-4-trimethylsilylindenyl)titanium dichloride, ethylenebis(2,4-dimethyl-5,6,7-trihydroindenyl) titanium dichloride, ethylene(2,4-dimethylcyclopentadienyl)(3',5'-dimethylcyclopentadienyl)

titanium dichloride, ethylene(2-methyl-4-t-butylcyclopentadienyl)(3'-t-butyl-51-methylcyclopentadienyl)titanium dichloride, ethylene(2,3,5-trimethylcyclopentadienyl)(2',4',5'-X trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)-titanium dichloride, methylene(cyclopentadienyl)(tetramethylcyclopentadienyl)-titanium dichloride, isopropylidene(cyclopentadienyl) (3,4-dimethylcyclopentadienyl)titanium dichloride, isopropylidene(cyclopentadienyl)(2,3,4,5-tetramethylcyclopentadienyl)titanium dichloride, isopropylidene(cyclopentadienyl)(3-methylindenyl)titanium dichloride, isopropylidene(cyclopentadienyl)(fluorenyl)titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl)titanium dichloride, ethylene(cyclopentadienyl)(3,5-dimethylcyclopentadienyl)titanium dichloride, ethylene(cyclopentadienyl) (fluorenyl) titanium dichloride, ethylene(2,5-dimethylcyclopentadienyl)(fluorenyl)titanium dichloride, ethylene(2,5-diethylcyclopentadienyl)(fluorenyl)titanium dichloride, diphenylmethylene(cyclopentadienyl)(3,4-diethylcyclopentadienyl)titanium dichloride, diphenylmethylene(cyclopentadienyl)(3,4-diethylcyclopentadienyl)titanium dichloride, cyclohexylidene(cyclopentadienyl)(fluorenyl)titanium dichloride, cyclohexylidene(2,5-dimethylcyclopentadienyl)(3',4'-dimethylcyclopentadienyl)titanium dichloride, etc.

(3) Transition metal compounds having two silylene-crosslinked, conjugated, 5-membered cyclic ligands, such as dimethylsilylenebis(indenyl)titanium dichloride, dimethylsilylenebis(4,5,6,7-tetrahydroindenyl)titanium dichloride, dimethylsilylenebis(2-methylindenyl)titanium dichloride, dimethylsilylenebis(2,4-dimethylindenyl) titanium dichloride, dimethylsilylenebis(2,4-dimethylcyclopentadienyl)(31,51-dimethylcyclopentadienyl)titanium dichloride, phenylmethylsilylenebis(indenyl)titanium dichloride, phenylmethylsilylenebis(4,5,6,7-tetrahydroindenyl)titanium dichloride, phenylmethylsilylenebis(2,4-dimethylindenyl) titanium dichloride, phenylmethylsilylene(2,4-dimethylcyclopentadienyl)(3',5'-dimethylcyclopentadienyl) titanium dichloride, phenylmethylsilylene(2,3,5-trimethylcyclopentadienyl)(2',4',5'-trimethylcyclopentadienyl)titanium dichloride, phenylmethylsilylenebis(tetramethylcyclopentadienyl)-titanium dichloride, diphenylsilylenebis(2,4-dimethylindenyl)titanium dichloride, diphenylsilylenebis(indenyl)titanium dichloride, diphenylsilylenebis(2-methylindenyl)titanium dichloride, tetramethyldisilylenebis (indenyl)titanium dichloride, tetramethyldisilylenebis (cyclopentadienyl)titanium dichloride, tetramethyldisilylene (3-methylcyclopentadienyl)(indenyl)titanium dichloride, a dimethylsilylene(cyclopentadienyl)(3,4-dimethylcyclopentadienyl)titanium dichloride, dimethylsilylene-(cyclopentadienyl) (trimethylcyclopentadienyl)titanium dichloride, dimethylsilylene-(cyclopentadienyl) (tetramethylcyclopentadienyl)titanium dichloride, dimethylsilylene(cyclopentadienyl)(3,4-diethylcyclopentadienyl)titanium dichloride, dimethylsilylene-(cyclopentadienyl) (triethylcyclopentadienyl)titanium dichloride, dimethylsilylene-(cyclopentadienyl) (tetraethylcyclopentadienyl)titanium dichloride, dimethylsilylene(cyclopentadienyl)(fluorenyl)titanium dichloride, dimethylsilylene(cyclopentadienyl)(2,7-di-t-butylfluorenyl)titanium dichloride, dimethylsilylene-(cyclopentadienyl) (octahydrofluorenyl) titanium dichloride, dimethylsilylene(2-methylcyclopentadienyl) (fluorenyl)titanium dichloride, dimethylsilylene(2,5-dimethylcyclopentadienyl)(fluorenyl)titanium dichloride, dimethylsilylene(2-ethylcyclopentadienyl)(fluorenyl) titanium dichloride, dimethylsilylene(2,5-diethylcyclopentadienyl)(fluorenyl)titanium dichloride, dimethylsilylene(2-methylcyclopentadienyl)(21,71-di-t-butylfluorenyl)titanium dichloride, dimethylsilylene(2,5-dimethylcyclopentadienyl)(2',7'-di-t-butylfluorenyl) titanium dichloride, dimethylsilylene(2-ethylcyclopentadienyl) (21,71-di-t-butylfluorenyl)titanium dichloride, dimethylsilylene(diethylcyclopentadienyl) (2,7-di-t-butylfluorenyl)titanium dichloride, dimethylsilylene-(methylcyclopentadienyl)(octahydrofluorenyl)titanium dichloride, dimethylsilylene-(dimethylcyclopentadienyl) (octahydrofluorenyl)titanium dichloride, dimethylsilylene-(ethylcyclopentadienyl)(octahydrofluorenyl)titanium dichloride, dimethylsilylene-(diethylcyclopentadienyl) (octahydrofluorenyl)titanium dichloride, etc.

(4) Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)titanium dichloride, dimethylgermylene(cyclopentadienyl)(fluorenyl)titanium dichloride, methylalumylenebis (indenyl) titanium dichloride, phenylamylenebis(indenyl)titanium dichloride, phenylphosphylenebis(indenyl)titanium dichloride, ethylborylenebis(indenyl)titanium dichloride, phenylamylenebis(indenyl)titanium dichloride, phenylamylene(cyclopentadienyl)(fluorenyl)titanium dichloride, etc.

(5) Transition metal compounds having one conjugated, 5-membered cyclic ligand, such as pentamethylcyclopentadienyl-bis(phenyl)aminotitanium dichloride, indenyl-bis(phenyl)aminotitanium dichloride, pentamethylcyclopentadienyl-bis(trimethylsilyl) aminotitanium dichloride, pentamethylcyclopentadi-enylphenoxytitanium dichloride, dimethylsilylene (tetramethylcyclopentadienyl)-phenylaminotitanium dichloride, dimethylsilylene(tetramethylcyclopentadienyl)-t-butylaminotitanium dichloride, dimethylsilylene (tetrahydroindenyl)decylaminotitanium dichloride, dimethylsilylene(tetrahydroindenyl)-[bis(trimethylsilyl) amino]titanium dichloride, dimethylgermylene-(tetramethylcyclopentadienyl)phenylaminotitanium dichloride, pentamethylcyclopentadienyltitanium trimethoxide, pentamethylcyclopentadienyltitanium trichloride, (t-butylamido)(tetramethyl-$\eta^5$- cyclopentadienyl)silane-titaniumdimethyl, (t-butylamido)(tetramethyl-η⁵-cyclopentadienyl)-1,2-ethane-diyltitanium dichloride, (methylamido)(tetramethyl-η⁵-cyclopentadienyl)-1,2-ethane-diyltitanium dichloride, (ethylamido) (tetramethyl-η⁵-cyclopentadienyl)-methylenetitanium dichloride, (t-butylamido)dimethyl-(tetramethyl-η⁵-cyclopentadienyl) silane-titaniumdichloride, (benzylamido)dimethyl-(tetramethyl-η⁵-cyclopentadienyl)silane-titanium dichloride, (phenylphosphido)dimethyl-(tetramethyl-η⁵-cyclopentadienyl)silane-titaniumdibenzyl, etc.

(6) Transition metal compounds having two conjugated, 5-membered cyclic ligands in which the ligands are double-crosslinked, such as (1,1'-dimethylsilylene)(2,21-isopropylene)bis(cyclopentadienyl)titanium dichloride, (1,1'-dimethylsilylene)(2,2'-dimethylsilylene)-bis(cyclopentadienyl)titanium dichloride, (1,1'-dimethylsilylene)(2,2'-isopropylidene)-bis(cyclopentadienyl)dimethyltitanium, (1,1'-dimethylsilylene)(2,2'-isopropylidene)-bis(cyclopentadienyl)dibenzyltitanium, (1,1'-dimethylsilylene)(2,2'-isopropylidene)-bis(cyclopentadienyl)bis(trimethylsilyl)titanium, (1,1'-dimethylsilylene)(2,2'-isopropylidene)-bis(cyclopentadienyl)bis(trimethylsilylmethyl)titanium, (1,2'-dimethylsilylene)(2,11-ethylene)-bis(indenyl)titanium dichloride, (1,1'-dimethylsilylene)(2,2'-ethylene)-bis(indenyl)titanium dichloride, (1,1'-ethylene)(2,2'-dimethylsilylene)-bis(indenyl)titanium dichloride, (1,1'-dimethylsilylene)(2,21-cyclohexylidene)-bis(indenyl)titanium dichloride, etc.

(7) Derivatives from compounds of (1) to (6) noted above, which are produced by substituting the chlorine atoms in those compounds of (1) to (6) with any of a bromine atom, an iodine atom, a hydrogen atom, a methyl group, a phenyl group and others, and by substituting the center metal, titanium in those transition metal compounds with any of zirconium, hafnium, niobium, molybdenum, tungsten and others.

III) As specific examples of the transition metal compounds of formula (4), mentioned are the following compounds.

They are transition metal compounds of formula (4), in which the group $(C_5H_{5-e}R^{11}_e)$ is any of the following formulae (I) to (VII):

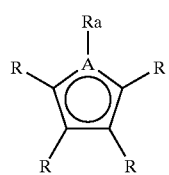

(I)

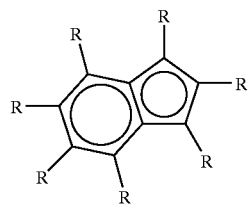

(II)

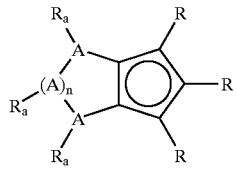

(III)

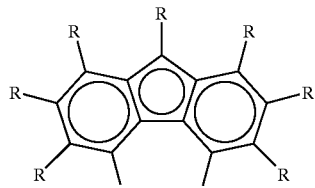

(IV)

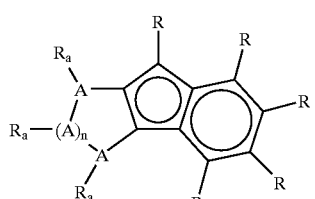

(V)

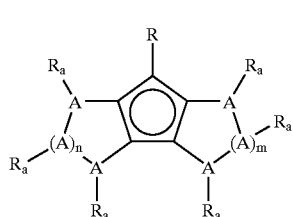

(VI)

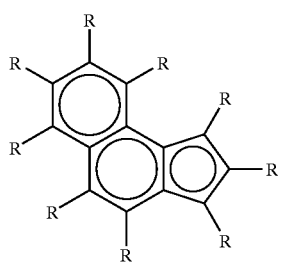

(VII)

wherein A represents an element of Group 13, 14, 15 or 16, and plural A's maybe the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or akylsilylalkyl group having from 3 to 30 carbon atoms, and R's may be the same or different, and may be optionally bonded to each other to form a cyclic structure; a represents 0, 1 or 2; and n and m each represent an integer of at least 1.

Specific examples of the group $(C_5H_{5-e}R^{11}_e)$ are mentioned below.

In the indenyl derivatives and the fluorenyl derivatives, the position of each substituent is indicated by the following position numbers.

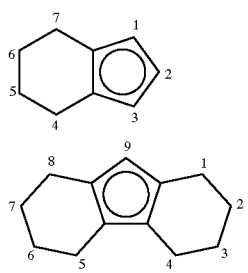

The group ($C_5H_{5-e}R^{11}_e$) includes, for example, a cyclopentadienyl group, a methylcyclopentadienyl group, a 1,2-dimethylcyclopentadienyl group, a 1,3-dimethylcyclopentadienyl group, a 1,2,3-trimethylcyclopentadienyl group, a 1,3,4-trimethylcyclopentadienyl group, a tetramethylcyclopentadienyl group, a pentamethylcyclopentadienyl group, an ethylcyclopentadienyl group, a 1,2-diethylcyclopentadienyl group, a 1,3-diethylcyclopentadienyl group, a 1,2,3-triethylcyclopentadienyl group, a 1,3,4-triethylcyclopentadienyl group, a tetraethylcyclopentadienyl group, a pentaethylcyclopentadienyl group, an indenyl group, a 1-methylindenyl group, a 1,2-dimethylindenyl group, a 1,3-dimethylindenyl group, a 1,2,3-trimethylindenyl group, a 2-methylindenyl group, a 1-ethylindenyl group, a 1-ethyl-2-methylindenyl group, a 1-ethyl-3-methylindenyl group, a 1-ethyl-2,3-dimethylindenyl group, a 1,2-diethylindenyl group, a 1,3-diethylindenyl group, a 1,2,3-triethylindenyl group, a 2-ethylindenyl group, a 1-methyl-2-ethylindenyl group, a 1,3-dimethyl-2-ethylindenyl group, a 4,5,6,7-tetrahydroindenyl group, a 1-methyl-4,5,6,7-tetrahydroindenyl group, a 1,2-dimethyl-4,5,6,7-tetrahydroindenyl group, a 1,3-dimethyl-4,5,6,7-tetrahydroindenyl group, a 1,2,3-trimethyl-4,5,6,7-tetrahydroindenyl group, a 2-methyl-4,5,6,7-tetrahydroindenyl group, a 1-ethyl-4,5,6,7-tetrahydroindenyl group, a 1-ethyl-2-methyl-4,5,6,7-tetrahydroindenyl group, a 1-ethyl-3-methyl-4,5,6,7-tetrahydroindenyl group, a 1-ethyl-2,3-dimethyl-4,5,6,7-tetrahydroindenyl group, a 1,2-diethyl-4,5,6,7-tetrahydroindenyl group, a 1,2-diethyl-3-methyl-4,5,6,7-tetrahydroindenyl group, a 1,3-diethyl-4,5,6,7-tetrahydroindenyl group, a 1,3-diethyl-2-methyl-4,5,6,7-tetrahydroindenyl group, a 1,2,3-triethyl-4,5,6,7-tetrahydroindenyl group, a 2-ethyl-4,5,6,7-tetrahydroindenyl group, a 1-methyl-2-ethyl-4,5,6,7-tetrahydroindenyl group, a 1,3-dimethyl-2-ethyl-4,5,6,7-tetrahydroindenyl group, a fluorenyl group, a 9-methylfluorenyl group, a 9-ethylfluorenyl group, a 1,2,3,4-tetrahydrofluorenyl group, a 9-methyl-1,2,3,4-tetrahydrofluorenyl group, a 9-ethyl-1,2,3,4-tetrahydrofluorenyl group, a 1,2,3,4,5,6,7,8-octahydrofluorenyl group, a 9-methyl-1,2,3,4,5,6,7,8-octahydrofluorenyl group, a 9-ethyl-1,2,3,4,5,6,7,8-octahydrofluorenyl group, etc.

Specific examples of the transition metal compounds of formula (4) are mentioned below. In these, titanium may be replaced with zirconium, and such zirconium compounds are also referred to herein to the same effect.

They are cyclopentadienyltitanium trichloride, cyclopentadienyltitaniumtrimethyl, cyclopenadienyltitanium trimethoxide, cyclopentadienyltitaniumtribenzyl, methylcyclopentadienyltitanium trichloride, methylcyclopentadienyltitaniumtrimethyl, methylcyclopentadienyltitanium trimethoxide, methylcyclopentadienyltitaniumtribenzyl, dimethylcyclopentadienyltitanium trichloride, dimethylcyclopentadienyltitaniumtrimethyl, dimethylcyclopentadienyltitanium trimethoxide, dimethylcyclopentadienyltitaniumtribenzyl, trimethylcyclopentadienyltitanium trichloride, trimethylcyclopentadienyltitaniumtrimethyl, trimethylcyclopentadienyltitanium trimethoxide, trimethyleyclopentadienyltitaniumtribenzyl, tetramethylcyclopentadienyltitanium trichloride, tetramethylcyclopentadienyltitaniumtrimethyl, tetramethylcyclopentadienyltitanium trimethoxide, tetramethylcyclopentadienyltitaniumtribenzyl, pentamethylcyclopentadienyltitanium trichloride, pentamethylcyclopentadienyltitaniumtrimethyl, pentamethylcyclopentadienyltitanium trimethoxide, pentamethylcyclopentadienyltitaniumtribenzyl, indenyltitanium trichloride, indenyltitaniumtrimethyl, indenyltitanium trimethoxide, indenyltitaniumtribenzyl, 1-methylindenyltitanium trichloride, 1-methylindenyltitaniumtrimethyl, 1-methylindenyltitanium trimethoxide, 1-methylindenyltitaniumtribenzyl, 2-methylindenyltitanium trichloride, 2-methylindenyltitaniumtrimethyl, 2-methylindenyltitanium trimethoxide, 1-methylindenyltitaniumtribenzyl, 1,2-dimethylindenyltitanium trichloride, 1,2-dimethylindenyltitaniumtrimethyl, 1,2-dimethylindenyltitanium trimethoxide, 1,2-dimethylindenyltitaniumtribenzyl, 1,3-dimethylindenyltitanium trichloride, 1,3-dimethylindenyltitaniumtrimethyl, 1,3-dimethylindenyltitanium trimethoxide, 1,3-dimethylindenyltitaniumtribenzyl, 1,2,3-trimethylindenyltitanium trichloride, 1,2,3-trimethylindenyltitaniumtrimethyl, 1,2,3-trimethylindenyltitanium trimethoxide, 1,2,3-trimethylindenyltitaniumtribenzyl, 1,2,3,4,5,6,7-heptamethylindenyltitanium trichloride, 1,2,3,4,5,6,7-heptamethylindenyltitaniumtrimethyl, 1,2,3,4,5,6,7-heptamethylindenyltitanium trimethoxide, 1,2,3,4,5,6,7-heptamethylindenyltitaniumtribenzyl, 4,5,6,7-tetrahydroindenyltitanium trichloride, 4,5,6,7-tetrahydroindenyltitaniumtrimethyl, 4,5,6,7-tetrahydroindenyltitanium trimethoxide, 4,5,6,7-tetrahydroindenyltitaniumtribenzyl, 1-methyl-4,5,6,7-tetrahydroindenyltitanium trichloride, 1-methyl-4,5,6,7-tetrahydroindenyltitaniumtrimethyl, 1-methyl-4,5,6,7-tetrahydroindenyltitanium trimethoxide, 1-methyl-4,5,6,7-tetrahydroindenyltitaniumtribenzyl, 2-methyl-4,5,6,7-tetrahydroindenyltitanium trichloride, 2-methyl-4,5,6,7-tetrahydroindenyltitanium trimethoxide, 2-methyl-4,5,6,7-tetrahydroindenyltitaniumtribenzyl, 1,2-dimethyl-4,5,6,7-tetrahydroindenyltitanium trichloride, 1,2-dimethyl-4,5,6,7-tetrahydroindenyltitaniumtrimethyl, 1,2-dimethyl-4,5,6,7-tetrahydroindenyltitanium trimethoxide, 1,2-dimethyl-4,5,6,7-tetrahydroindenyltitaniumtribenzyl, 1,3-dimethyl-4,5,6,7-tetrahydroindenyltitanium trichloride, 1,3-dimethyl-4,5,6,7-tetrahydroindenyltitaniumtrimethyl, 1,3-dimethyl-4,5,6,7-tetrahydroindenyltitanium trimethoxide, 1,3-dimethyl-4,5,6,7-tetrahydroindenyltitaniumtribenzyl, 1,2,3-trimethyl-4,5,6,7-tetrahydroindenyltitanium trichloride, 1,2,3-trimethyl-4,5,6,7-tetrahydroindenyltitaniumtrimethyl, 1,2,3-trimethyl-4,5,6,7-tetrahydroindenyltitanium trimethoxide, 1,2,3-trimethyl-4,5,6,7-tetrahydroindenyltitaniumtribenzyl, 1-ethyl-4,5,6,7-tetrahydroindenyltitanium trichloride, 1-ethyl-4,5,6,7-tetrahydroindenyltitaniumtrimethyl, 1-ethyl-4,5,6,7-tetrahydroindenyltitanium trimethoxide, 1-ethyl-4,5,6,7-tetrahydroindenyltitaniumtribenzyl, 1-ethyl-2-methyl-4,5,6,7-tetrahydroindenyltitanium trichloride, 1-ethyl-2-methyl-4,5,6,7-tetrahydroindenyltitaniumtrimethyl, 1-ethyl-2-methyl-4,5,6,7-tetrahydroindenyltitanium trimethoxide, 1-ethyl-2-methyl-4,5,6,7-tetrahydroindenyltitaniumtribenzyl, 1-ethyl-3-methyl-4,5,6,7-tetrahydroindenyltitanium trichloride, 1-ethyl-3-methyl-4,5,6,7-tetrahydroindenyltitanium trichloride, 1-ethyl-3-methyl-4,5,6,7-tetrahydroindenyltitaniumtrimethyl, 1-ethyl-3-methyl-4,5,6,7-tetrahydroindenyltitanium trimethoxide, 1-ethyl-3-methyl-4,5,6,7-tetrahydroindenyltitaniumtribenzyl, 1-ethyl-2,3-dimethyl 4,5,6,7-tetrahydroindenyltitanium trichloride, 1-ethyl-2,3-dimethyl-4,5,6,7-tetrahydroindenyltitaniumtrimethyl, 1-ethyl-2,3-dimethyl-4,5,6,7-tetrahydroindenyltitanium trimethoxide, 1-ethyl-2,3-dimethyl-4,5,6,7-tetrahydroindenyltitaniumtribenzyl, 1,2-diethyl-4,5,6,7-tetrahydroindenyltitanium trichloride, 1,2-diethyl-4,5,6,7-tetrahydroindenyltitaniumtrimethyl, 1,2-diethyl-4,5,6,7-tetrahydroindenyltitanium trimethoxide, 1,2-diethyl-4,5,6,7-tetrahydroindenyltitaniumtribenzyl, 1,2-diethyl-3-methyl-4,5,6,7-tetrahydroindenyltitanium trichloride, 1,2-diethyl-3-methyl-4,5,6,7-tetrahydroindenyltitaniumtrimethyl, 1,2-diethyl-3-methyl-4,5,6,7-tetrahydroindenyltitanium trimethoxide, 1,2-diethyl-3-methyl-4,5,6,7-tetrahydroindenyltitaniumtribenzyl, 1,3-diethyl-4,5,6,7-tetrahydroindenyltitanium trichloride, 1,3-diethyl-4,5,6,7-tetrahydroindenyltitaniumtrimethyl, 1,3-diethyl-4,5,6,7-tetrahydroindenyltitanium trimethoxide, 1,3diethyl-4,5,6,7-tetrahydroindenyltitaniumtribenzyl, 1,3-diethyl-2-methyl-4,5,6,7-tetrahydroindenyltitanium trichloride, 1,3-diethyl-2-methyl-4,5,6,7-tetrahydroindenyltitaniumtrimethyl, 1,3-diethyl-2-methyl-4,5,6,7-tetrahydroindenyltitanium trimethoxide, 1,3-diethyl-2-methyl-4,5,6,7-tetrahydroindenyltitaniumtribenzyl, 1,2,3-triethyl-4,5,6,7-tetrahydroindenyltitanium trichloride, 1,2,3-triethyl-4,5,6,7-tetrahydroindenyltitaniumtrimethyl, 1,2,3-triethyl-4,5,6,7-tetrahydroindenyltitanium trimethoxide, 1,2,3-triethyl-4,5,6,7-tetrahydroindenyltitaniumtribenzyl, 2-ethyl-4,5,6,7-tetrahydroindenyltitanium trichloride, 2-ethyl-4,5,6,7-tetrahydroindenyltitaniumtrimethyl, 2-ethyl-4,5,6,7-tetrahydroindenyltitanium trimethoxide, 2-ethyl-4,5,6,7-tetrahydroindenyltitaniumtribenzyl, 1-methyl-2-ethyl-4,5,6,7-tetrahydroindenyltitanium trichloride, 1-methyl-2-ethyl-4,5,6,7-tetrahydroindenyltitaniumtrimethyl, 1-methyl-2-ethyl-4,5,6,7-tetrahydroindenyltitanium trimethoxide, 1-methyl-2-ethyl-4,5,6,7-tetrahydroindenyltitaniumtribenzyl, 1,3-dimethyl-2-ethyl-4,5,6,7-tetrahydroindenyltitanium trichloride, 1,3-dimethyl-2-ethyl-4,5,6,7-tetrahydroindenyltitaniumtrimethyl, 1,3-dimethyl-2-ethyl-4,5,6,7-tetrahydroindenyltitanium trimethoxide, 1,3-dimethyl-2-ethyl-4,5,6,7-tetrahydroindenyltitaniumtribenzyl, 1,2,3,4-tetrahydrofluorenyltitanium trichloride, 1,2,3,4-tetrahydrofluorenyltitaniumtrimethyl, 1,2,3,4-tetrahydrofluorenyltitanium trimethoxide, 1,2,3,4-tetrahydrofluorenyltitaniumtribenzyl, 9-methyl-1,2,3,4-tetrahydrofluorenyltitanium trichloride, 9-methyl-1,2,3,4-tetrahydrofluorenyltitaniumtrimethyl, 9-methyl-1,2,3,4-tetrahydrofluorenyltitanium trimethoxide, 9-methyl-1,2,3,4-tetrahydrofluorenyltitaniumtribenzyl, 9-ethyl-1,2,3,4-tetrahydrofluorenyltitanium trichloride, 9-ethyl-1,2,3,4-tetrahydrofluorenyltitaniumtrimethyl, 9-ethyl-1,2,3,4-tetrahydrofluorenyltitanium trimethoxide, 9-ethyl-1,2,3,4-tetrahydrofluorenyltitaniumtribenzyl, 1,2,3,4,5,6,7,8-octahydrofluorenyltitanium trichloride, 1,2,3,4,5,6,7,8-octahydrofluorenyltitaniumtrimethyl, 1,2,3,4,5,6,7,8-octahydrofluorenyltitanium trimethoxide, 1,2,3,4,5,6,7,8-octahydrofluorenyltitaniumtribenzyl, 9-methyl-1,2,3,4,5,6,7,8-octahydrofluorenyltitanium trichloride, 9-methyl-1,2,3,4,5,6,7,0-octahydrofluorenyltitaniumtrimethyl, 9-methyl-1,2,3,4,5,6,7,8-octahydrofluorenyltitanium trimethoxide, 9-ethyl-1,2,3,4,5,6,7,8-octahydrofluorenyltitanium trichloride, 9-ethyl-1,2,3,4,5,6,7,87 octahydrofluorenyltitaniumtrimethyl, 9-ethyl-1,2,3,4,5,6,7,8-octahydrofluorenyltitanium trimethoxide, 9-ethyl-1,2,3,4,5,6,7,8-octahydrofluorenyltitaniumtribenzyl, etc.; as well as their derivatives to be produced by substituting the titanium element in those compounds with zirconium or hafnium, or with any other element of different Groups, and also their analogues having a transition metal element of lanthanides. However, these are not limitative.

(III) Specific Examples of the transition metal compounds of formula (5) include tetramethyltitanium, tetrabenzyltitanium, tetraethyltitanium, tetraphenyltitanium, tetramethoxytitanium, tetraethoxytitanium, tetrephenoxytitanium, tetra(dimethylamino) titanium, tetra(diethylamino) titanium, tetra(diphenylamino)titanium; bis(phenoxy)titanium compounds described in Macromolecules, 1997, 30, 1562–1569, in Journal of Organometallic Chemistry, 514 (1996), 213-217, etc.; diamidotitanium compounds described in Macromolecules, 1996, 29, 5241–5243, in Organometallics, 1997, 16, 1491–1496, etc.; their derivatives to be produced by substituting the titanium element in those compounds with zirconium or hafnium, or with any other element of different Groups, and also their analogues having a transition metal element of lanthanides.

(IV) In the transition metal compounds of formula (6), $M^2$ represents a transition metal of Groups B to 10 of the Periodic Table, concretely including iron, cobalt, nickel, palladium, platinum, etc. Of those, preferred are nickel and palladium. $L^1$ and $L^2$ each represents a coordination-bonding ligand; and $X^1$ and $Y^1$ each represent a covalent-bonding or ionic-bonding ligand. As mentioned hereinabove, $X^1$ and $Y^1$ include, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophosphorane, etc.

L¹, L², X¹ and Y¹ may be bonded to each other to form a cyclic structure.

The compounds of transition metals of Groups 8 to 10 of the Periodic Table preferably have a diimine compound as the ligand, including, for example, complex compounds of a general formula (1-7):

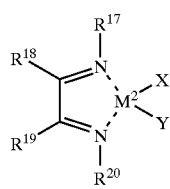

(7)

wherein $R^{17}$ and $R^{20}$ each independently represent an aliphatic hydrocarbon group having from 1 to 20 carbon atoms, or an aromatic group having a hydrocarbon group on the ring and having from 7 to 20 carbon atoms in total; $R^{18}$ and $R^{19}$ each independently represent a hydrogen atom, or a hydrocarbon group having from 1 to 20 carbon atoms, and $R^{18}$ and $R^{19}$ may be bonded to each other to form a ring; X and Y each independently represent a hydrogen atom, or a hydrocarbon group having from 1 to 20 carbon atoms; and $M^2$ represents a transition metal of Groups 8 to 10 of the Periodic Table.

In formula (7), the aliphatic hydrocarbon group having from 1 to 20 carbon atoms for R and $R^{20}$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group or the like may be introduced. The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^{17}$ and $R^{20}$, preferred is an aromatic group having a hydrocarbon group on the ring, and especially preferred is a 2,6-diisopropylphenyl group. $R^{17}$ and $R^2$ may be the same or different.

The hydrocarbon group having from 1 to 20 carbon atoms for $R^{18}$ and $R^{19}$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^{18}$ and $R^{19}$, referred to are those of the C1–20 aliphatic hydrocarbon group mentioned hereinabove for $R^{17}$ and $R^{20}$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^{17}$ and $R^{18}$ may be the same or different, and may be bonded to each other to form a ring.

For examples of the hydrocarbon group having from 1 to 20 carbon atoms for X and Y, referred to are those of the C1–20 hydrocarbon group mentioned hereinabove for $R^{18}$ and $R^{19}$. For X and Y, especially preferred is a methyl group. X and Y may be the same or different.

The transition metal of Groups 8 to 10 of the Periodic Table for $M^2$ includes, for example, nickel, palladium, platinum, iron, cobalt, rhodium, ruthenium, etc. Preferred are nickel and palladium.

Specific examples of the complex compounds of formula (7) are compounds of the following formulae [1], [2], [3], [4], [5], [6], [7], [8], [9], [10], [11] and [12].

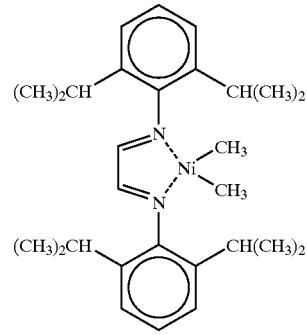

(1)

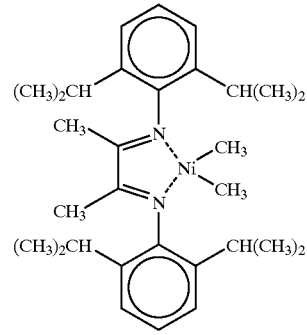

(2)

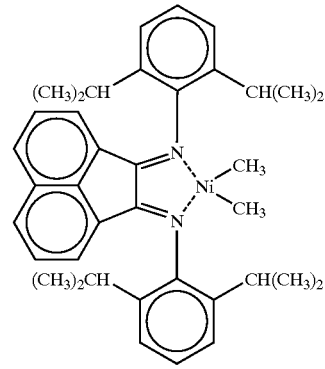

(3)

(4)
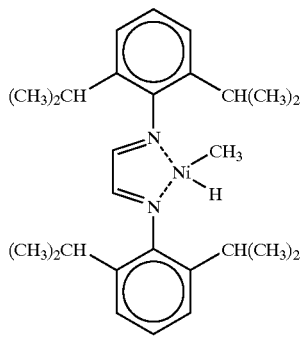
(5)
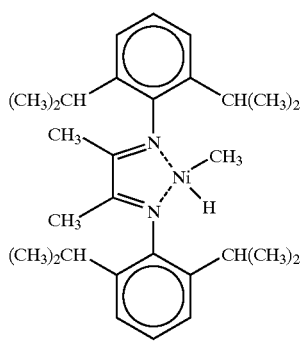
(6)
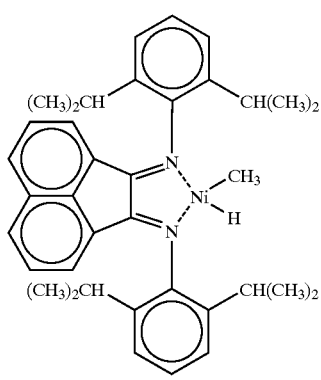
(7)
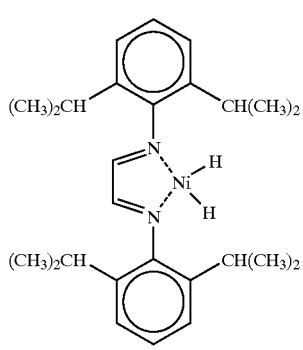
(8)
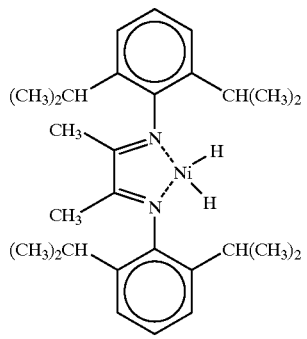
(9)
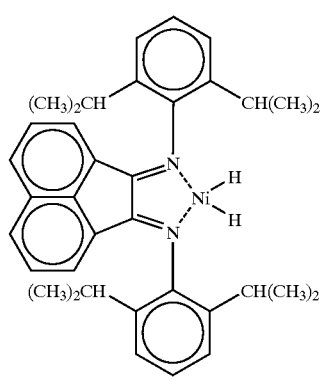
(10)
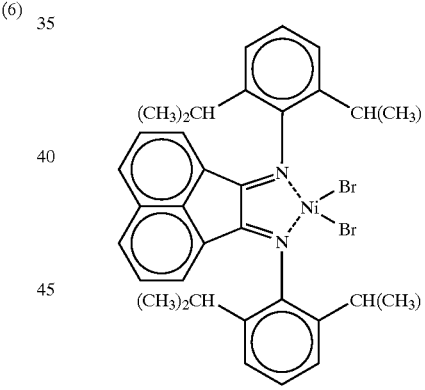
(11)
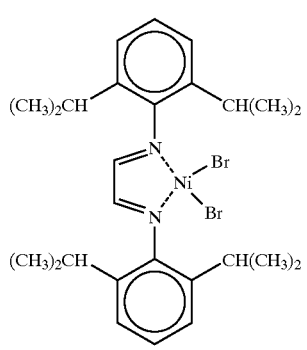

(12)

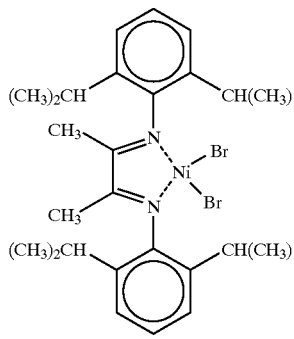

Specific examples of the transition metal compounds of formula (7) include dibromobistriphenylphosphine nickel, dichlorobistriphenylphosphine nickel, dibromodiacetonitrile nickel, dibromodibenzonitrile nickel, dibromo(1,2-bisdiphenylphosphinoethane) nickel, dibromo(1,3-bisdiphenylphosphinopropane) nickel, dibromo(1,1'-diphenylbisphosphinoferrocene) nickel, dimethylbisdiphenylphosphine nickel, dimethyl(1,2-bisdiphenylphosphinoethane) nickel, methyl(1,2-bisdiphenylphosphinoethano)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane) palladium, bistriphenylphosphinopalladium bistetrafluoroborate, bis(2,2'-bipyridino)methyliron tetrafluoroborate etherate, etc.

Of those, preferred are cationic complexes such as methyl (1,2-bisdiphenylphosphinoethano)nickel tetrafluoroborate, bistriphenylphosphinopalladium bistetrafluoroborate, and bis(2,2'-bipyridino)methyliron tetrafluoroborate etherate.

In the invention, one or more of the complex compounds noted above may be used either singly or as combined.

Component (B):

(a) an oxygen-containing compound, and/or (b) a compound capable of reacting with a transition metal compound to form an ionic complex, preferably (a) an oxygen-containing compound.

In the invention, both a catalyst for copolymerization which comprises the component (B) as an essential component and a catalyst for copolymerization which does not comprise the component (B).

(a) Oxygen-Containing Compound:

Herein used are oxygen-containing compounds of a general formula (8):

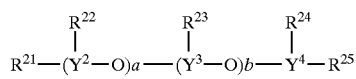

(8)

and/or those of a general formula (9):

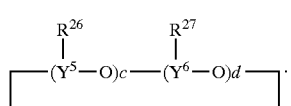

(9)

In formulae (8) and (9), $R^{21}$ to $R^{27}$ each represent an alkyl group having from 1 to 8 carbon atoms, concretely including a methyl group, an ethyl group, an n-propyl group, an isopropyl group, all types of butyl groups, all types of pentyl groups, all types of hexyl group, all types of heptyl groups, and all types of octyl groups. $R^{21}$ to $R^{27}$ may be the same or different; and $R^{26}$ and $R^{27}$ may be the same or different. $Y^2$ to $Y^6$ each represent an element of Group 13 of the Periodic Table, concretely including B, Al, Ga, In and Tl. Of these, preferred are B and Al. $Y^2$ to $Y^4$ may be the same or different; and $Y^5$ and $Y^6$ may be the same or different. a to d each indicates a number of from 0 to 50, but (a+b) and (c+d) each must be at least 1. a to d each preferably falls between 1 and 20, more preferably between 1 and 10, even more preferably between 1 and 5.

As the oxygen-containing compound for the catalyst component, preferred are alkylaluminoxanes. Preferred examples of the compound are methylaluminoxane and isobutylaluminoxane.

(b) Compound Capable of Reacting with a Transition Metal Compound to Form an Ionic Complex:

The compound capable of reacting with a transition metal compound to form an ionic complex includes coordination complex compounds that comprise an anion with plural groups bonded to a metal, and a cation, and Lewis acids. Known are various coordination complex compounds that comprise an anion with plural groups bonded to a metal, and a cation. For example, compounds of the following general formula (10) or (11) are preferably used in the invention.

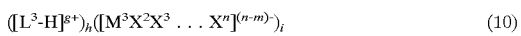

(10)

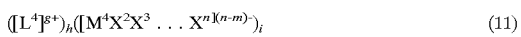

(11)

wherein $L^4$ indicates $M^5$, $R^{28}R^{29}M^6$ or $R^{30}{}_3C$, which will be mentioned hereinafter; $L^3$ represents a Lewis base; $M^3$ and $M^4$ each represent a metal selected from Group 5 to Group 15 of the Periodic Table; $M^5$ represents a metal selected from Group 1, and Group 8 to Group 12 of the Periodic Table; $M^6$ represents a metal selected from Group 8 to Group 10 of the Periodic Table; $X^2$ to $X^n$ each represent a hydrogen atom, a dialkylamino group, an alkoxy group, an aryloxy group, an alkyl group having from 1 to 20 carbon atoms, an aryl group having from 6 to 20 carbon atoms, an alkylaryl group, an arylalkyl group, a substituted alkyl group, an organometalloid group, or a halogen atom; $R^{28}$ and $R^{29}$ each represent a cyclopentadienyl group, a substituted cyclopentadienyl group, an indenyl group, or a fluorenyl group; $R^{30}$ represents an alkyl group; m indicates the valency of $M^3$ or $M^4$, and represents an integer of from 1 to 7; n represents an integer of from 2 to 8; g indicates the ion valency of $L^3$-H or $L^4$, and represents an integer of from 1 to 7; h represents an integer of 1 or more; and i=h×g/(n-m).

Specific examples of $M^3$ and $M^4$ include atoms of B, Al, Si, P, As, Sb, etc.; those of $M^5$ include atoms of Ag, Cu, Na, Li, etc.; and those of $M^6$ include atoms of Fe, Co, Ni, etc. Specific examples of $X^2$ to $X^n$ include a dimethylamino group, a diethylamino group, etc., as a dialkylamino group; a methoxy group, an ethoxy group, an n-butoxy group, etc., as an alkoxy group; a phenoxy group, a 2,6-dimethylphenoxy group, a naphthyloxy group, etc., as an aryloxy group; a methyl group, an ethyl group, an n-propyl group, an isopropyl group, an n-butyl group, an n-octyl group, a 2-ethylhexyl group, etc., as an alkyl group having from 1 to 20 carbon atoms; a phenyl group, a p-tolyl group, a benzyl group, a pentafluorophenyl group, a 3,5-di (trifluoromethyl)phenyl group, a 4-tert-butylphenyl group, a 2,6-dimethylphenyl group, a 3,5-dimethylphenyl group, a 2,4-dimethylphenyl group, a 1,2-dimethylphenyl group, etc., as an aryl group having from 6 to 20 carbon atoms, an alkylaryl group or an arylalkyl group; F, Cl, Br, I, as a halogen; and a pentamethylantimonyl group, a trimethylsilyl group, a trimethylgermyl group, a diphenylarsenyl group, a dicyclohexylantimonyl group, a diphenylboryl group, etc., as an organometalloid group. Specific examples of the substituted cyclopentadienyl group for $R^{28}$ and $R^{29}$ include a methylcyclopentadienyl group, a butylcyclopentadienyl group, a pentamethylcyclopentadienyl group, etc.

In the invention, concretely, the anion with plural groups bonded to a metal includes $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B[C_6(CF_3)F_4]_4^-$, $B(C_6H_5)_4^-$, $PF_6^-$, $P(C_6F_5)_6^-$, $Al(C_6HF_4)_4^-$, etc. The cation includes, for example, $CP_2Fe^+$, $(MeCp)_2Fe^+$, $(tBuCp)_2Fe^+$, $(Me_2CP)_2Fe^+$, $(Me_3CP)_2Fe^+$, $(Me_4CP)_2Fe^+$, $(Me_5CP)_2Fe^+$, $Ag^+$, $Na^+$, $Li^+$, etc. The other cations include, for example, those from nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, N,N-diethylanilinium, etc.; those from carbenium compounds such as triphenylcarbenium, tri(4-methylphenyl)carbenium, tri(4-methoxyphenyl)carbenium, etc.; alkylphosphonium ions such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, $(C_3H_7)_4P^+$, etc.; arylphosphonium ions such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, $(C_2H_5)_2(C_6H_5)_2P^+$, etc.

Of the compounds of formulae (10) and (11), concretely, the following are especially preferred. Preferred examples of the compounds of formula (10) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl) borate, pyrrolinium tetra(pentafluorophenyl)borate, N,N-dimethylanilinium tetrakis(pentafluorophenyl)borate, methyldiphenylammonium tetrakis(pentafluorophenyl)borate, etc. Preferred examples of the compounds of formula (11) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis (pentafluorophenyl)borate, silver tetraphenylborate, silver tetrakis(pentafluorophenyl)borate, trityl tetraphenylborate, trityl tetrakis (pentafluorophenyl)borate, silver hexafluoroarsenate, silver hexafluoroantimonate, silver tetrafluoroborate, etc.

The Lewis acid includes, for example, $B(C_6F_5)_3$, $B(C_6HF_4)_3$, $B(H_2F_3)_3$, $B(C_6H_3F_2)_3$, $B(C_6H_4F)_3$, $B(C_6H_5)_3$, $BF_3$, $B[C_6(CF_3)F_4]_3$, $PF_5$, $P(C_6F_5)_5$, $Al(C_6HF_4)_3$, etc.

Component (C):

This is a compound of the following general formula (1):

$$((R^1)_3-X-Y)n-Z-(R^2)m-n \quad (1)$$

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, $R^1$'s may be the same or different, and $R^1$'s may be optionally bonded to each other to form a cyclic structure; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m-1), Especially preferred are the following compounds: (1) X is carbon, Y is oxygen and Z is aluminium; (2) at least one of three $R^1$'s is an aromatic hydrocarbon group having from 6 to 30 carbon atoms; (3) three $R^1$'s are all hydrocarbon groups each having at least one carbon atom; (4) three $R^1$'s are all aromatic hydrocarbon groups each having from 6 to 30 carbon atoms, preferably phenyl groups; (5) $R^2$ is an alkyl group having at least 2 carbon atoms.

Concretely, more preferred those where $R^1$'s are all phenyl groups, X is carbon, Y is oxygen, Z is aluminium, n 1, and $R^2$ is an isobutyl group.

The compounds for the component (C) are not specifically defined for their production method, so far as they have the structure of the formula mentioned above, but preferred are those produced by reacting <1> at least one selected from compounds of a general formula, $(R^1)_3-C-OR^1$, $R^1-CO-R^1$ or $R^1-CO-OR^1$, with <2>a compound of a general formula, $Z(R^2)m$. (In these formulae, $R^1$,Z or $R^2$ same as described above.)

Concretely, they are reaction products of at least one selected from alcohols, ethers, aldehydes, ketones, carboxylic acids and carboxylates, with an aluminium compound. Preferred are reaction products of alcohols with an aluminium compound. For these, preferred are the following: (1) at least one of three $R^1$'s for $(R^1)_3$ is an aromatic hydrocarbon group having from 6 to 30 carbon atoms; (2) three $R^1$'s for $(R^1)_3$ are all hydrocarbon groups each having at least one carbon atom; (3) three $R^1$'s for $(R^1)_3$ are all aromatic hydrocarbon groups each having from 6 to 30 carbon atoms, preferably phenyl groups; (4) $R^2$ is an alkyl group having at least 2 carbon atoms. Concretely, more preferred are those where $R^1$'s are all phenyl groups, and $R^2$ is an isobutyl group. Most preferred is a reaction product of triphenylmethyl alcohol with triisobutylaluminium.

The reaction condition for the compound <1> and the compound <2> is not specifically defined, but is preferably as follows: They are blended in a ratio by mol, compound <1>/compound <2> falling between 1/0.1 and 1/10, more preferably between 1/0.5 and 1/2, even more preferably between 1/0.8 and 1/1.2. The reaction temperature falls between −80° C. and 300° C., more preferably between −10° C. and 50° C. The reaction time falls between 0.1 minutes and 50 hours, more preferably between 0.1 minutes and 3 hours. The solvent for the reaction is not also specifically defined, but is preferably the same one as that for copolymerization to be effected in the presence of the catalyst.

In place of using the compound of the above-mentioned general formula as the component (C), a compound of the following (C1) and a compound of the following (C2) may be directly added to the site of catalyst production or to the site of copolymerization to form the component (C) in situ. In this case, the catalyst components are the transition metal compound (A), an oxygen-containing compound, and/or a compound capable of reacting with a transition metal to form an ionic complex(B), the compounds (C1) and (C2), and optionally an alkylating agent (D).

(C1) is least one selected from compounds of a general formula, $(R^2)_3-C-OR^1$, $R^1-CO-R^1$ or $R^1-CO-OR^1$; and (C2) is a 9 compound of a general formula, $Z(R^2)_m$. In these formulae, RL represents a hydrogen atom, a halogen atom, an aliphatic F, hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and $R^1$'s may be the same or different, and $R^1$ may be optionally bonded to each other to form a cyclic structure. Z represents a metal element of Groups 2 to 13; m is an integer, indicating the valency of the metal element Z; and $R^2$ represents a hydrocarbon group.

Concretely, (C1) is at least one selected from alcohols, ethers, aldehydes, ketones, carboxylic acids and carboxylates, preferably from alcohols; and (C2) is an aluminium compound. For these, preferred are the following: (1) at least one of three $R^1$'s for $(R^1)_3$ is an aromatic hydrocarbon group having from 6 to 30 carbon atoms; (2) three $R^1$'s for $(R^1)_3$ are all hydrocarbon groups each having at least one carbon atom; (3) three $R^1$'s for $(R^1)_3$ are all aromatic hydrocarbon groups each having from 6 to 30 carbon atoms, preferably phenyl groups;

(4) $R^2$ is an alkyl group having at least 2 carbon atoms. More concretely, the most preferred combination is (C1) of triphenylmethyl alcohol and (C2) of triisobutylaluminium.

(D) Alkylating Agent:

The catalyst of the invention for production of olefin-styrene copolymers optionally contains an alkylating agent. Various types of alkylating agents are known and are usable in the invention, including, for example, alkyl group-having aluminium compounds of a general formula (12):

$$R^{31}_m Al(OR^{32})_n X_{3-m-n} \quad (12)$$

wherein $R^{31}$ and $R^{32}$ each represent an alkyl group having from 1 to 0, preferably from 1 to 4 carbon atoms; X represents a hydrogen atom or a halogen atom; 0<m<3, but preferably m is 2 or 3, most preferably 3; 0≦n<3, but preferably n is 0 or 1;

alkyl group-having magnesium compounds of a general formula (13):

$$R^{31}_2 Mg \quad (13)$$

wherein $R^{31}$ has the same meaning as above; and alkyl group-having zinc compounds of a general formula (14):

$$R^{31}_2 Zn \quad (14)$$

wherein $R^{28}$ has the same meaning as above.

Of these alkyl group-having compounds, preferred are alkyl group-having aluminium compounds; and more preferred are trialkylaluminium compound and dialkylaluminium compounds. Concretely, they include trialkylaluminiums such as trimethylaluminium, triethylaluminium, tri-n-propylaluminium, triisopropylaluminium, tri-n-butylaluminium, triisobutylaluminium, tri-t-butylaluminium, etc.; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-t-butylaluminium chloride, etc.; dialkylaluminium alkoxides such as dimethylaluminium methoxide; dimethylaluminium ethoxide, etc.; dialkylaluminium hydrides such as dimethylaluminium hydride, diethylaluminium hydride, diisobutylaluminium hydride, etc. Further mentioned are dialkylmagnesiums such as dimethylmagnesium, diethylmagnesium, di-n-propylmagnesium, diisopropylmagnesium, etc.; dialkylzincs such as dimethylzinc, diethylzinc, di-n-propylethylzinc, diisopropylzinc, etc.

2. Method for Producing Catalyst:

(1) Order of Contacting Constituent Components:

To produce the catalyst of the invention, the order of contacting the constituent components with each other is not specifically defined. For example, the components may be contacted with each other in the following manner.

(i) For producing the catalyst comprising the component (A), the component (B) and the component (C), for example, employable is <1>a method of first contacting the component (A) with the component (B), followed by further contacting it with the component (C); <2>a method of first contacting the component (A) with the component (C) followed by further contacting it with the component (B); <3>a method of first contacting the component (B) with the component (C) followed by further contacting it with the component (A); or <4>a method of contacting the three components all together.

When the catalyst contains the optional component (D), the order of contacting the component (D) with the other components is not specifically defined. For example, in the process of producing the catalyst, the component (A) may be contacted with the component (D); or the component (B) may be contacted with the component (D); or the component (C) may be contacted with the component (D). As the case may be, the components (A), (B) and (D) are first contacted all together with each other and then with the component (C).

(ii) For producing the catalyst comprising the component (A), the component (B), the component (C1) and the component (C2), the order of contacting these components with each other is not also specifically defined, like in the case (i). Preferably, however, the component (C1) and the component (C2) are first contacted with each other prior to being contacted with the other components. The same as in the case (i) shall apply also to the case (ii) of producing the catalyst containing the optional component (D).

(iii) In the case of which does not use the component (B), the order of contacting these components with each other is the same as mentioned above.

(2) Blend ratio of Constituent Components:

(i) In the case of using the component (B):

<1>Regarding the ratio by mol of the component (A) to the component (B), referred to is a case where an organoaluminium compound is used as the oxygen-containing compound of the component (B). In that case, the molar ratio of the component (A) to the component (B) may fall between 1/1 and 1/10,000, but preferably between 1/10 and 1/1,000, in terms of the molar ratio to the aluminium atom in (B). Referred to is a case where a boron compound is used as a compound capable of reacting with a transition metal compound to form an ionic complex of the component (B). In that case, the molar ratio of the component (A) to the component (B) may fall between 1/0.5 and 1/10, but preferably between 1/0.8 and 1/5, in terms of the molar ratio to the boron atom in (B).

(ii) In the Both Cases of Using the Component (B) and not Using the Component (B):

<1>Regarding the ratio by mol of the component (A) to the component (C), referred to is a case where an aluminium compound is used as the component (C). In that case, the molar ratio of the component (A) to the component (C) may fall between 1/0.5 and 1/1,000, but more preferably between 1/1 and 1/100, in terms of the molar ratio to the aluminium atom in (C). Regarding the ratio by mol of the component (A) to the component (D), referred to is a case where an aluminium compound is used as the component (D). In that case, the molar ratio of the component (A) to the component (D) may fall between 1/0.5 and 1/1,000, but preferably between 1/1 and 1/100, in terms of the molar ratio to the aluminium atom in (D).

<2>Where the catalyst contains a combination of the component (C1) and the component (C2), but not the component (C), the molar ratio of (C1) to (C2) may fall between 1/0.1 and 1/10, precisely between 1/0.5 and 1/2, but more preferably between 1/0.8 and 1/1.2.

Regarding the ratio by mol of the component (A) to the component (C2), referred to is a case where an aluminium compound is used as the component (C2). In that case, the molar ratio of the component (A) to the component (C2) may fall between 1/0.5and 1/1,000, but preferably between 1/1 and 1/100, in terms of the molar ratio to the aluminium atom in (C2). Regarding the blend ratio of the component (D), the same as in the case <1> shall apply also to the case <2>.

(3) Condition for Contacting Constituent Components:

To produce the catalyst, the constituent components may be contacted with each other in an inert atmosphere of nitrogen or the like, at a temperature not higher than the temperature at which the catalyst is used for copolymerization. As the case may be, they may be contacted with each other at a temperature falling between −30 and 200° C.

II. Method for Producing Olefin-Styrene Copolymers:

1. Monomers to be Polymerized:

In the method of the invention for producing olefin-styrene copolymers, used is the above-mentioned catalyst for copolymerization of olefins and styrenes.

Olefin for the method are not specifically defined, but preferred are a-olefins having from 2 to 20 carbon atoms. Especially preferred are ethylene and propylene.

They include α-olefins such as ethylene, propylene, 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; and cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc.

Styrenes for the method are not specifically defined, but preferred are styrene, alkylstyrenes, and divinylbenzene. Especially preferred are styrene, α-methylstyrene, p-methylstyrene and divinylbenzene.

They include styrene; alkylstyrenes such as p-methylstyrene, p-ethylstyrene, p-prorylstyrene, p-isopropylstyrene, p-buthylstyrene, p-tert-buthlstyrene, p-phenylstyrene, o-methylstyrene, o-ethylstyrene, o-prorylstyrene, o-isopropylstyrene, m-methylstyrene, m-ethylstyrene, m-isopropylstyrene, m-buthylstyrene, mesitylstyrene, 2,4-dimethylstyrene, 2,5-dimethylstyrene, 3,5-dimethylstyrene etc.; alkoxystyrene such as p-methoxystyrene, o-methoxystyrene, m-methoxystyrene etc.; halogen-substituted styrene such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene etc.; trimethylsylylstyrene, vinylbenzoate esters, divinylbenzene etc.

In the invention, one or more olefins or styrenes such as those mentioned above may be copolymerized in any desired combination.

2. Copolymerization Condition:

The method for polymerizing olefins and styrenes is not specifically defined and may be any ordinary one including, for example, slurry copolymerization, solution copolymerization, vapor-phase copolymerization, bulk copolymerization, suspension copolymerization, etc. In the method, the order of contacting the catalyst components with monomers is not also specifically defined. One embodiment comprises contacting the catalyst components with each other to prepare a catalyst in advance in the manner mentioned above, followed by applying monomers to the catalyst batch. Another comprises putting the catalyst components and monomers into a copolymerization reactor in any desired order. Preferably, the components except the component (C) or except the components (C1) and (C2), or that is, the components (A), (B) and (D) are blended in a reactor, while, on the other hand, monomers are blended with the component (C) or with the components (C1) and (C2) in a different reactor, and the two blends in different reactors are mixed just before the start of copolymerization of the monomers. Having been thus blended, the monomers begin to polymerize in the presence of the catalyst formed in situ.

For the copolymerization, a solvent may be used. The solvent includes hydrocarbons and halogenohydrocarbons such as benzene, toluene, xylene, n-hexane, n-heptane, cyclohexane, methylene chloride, chloroform, 1,2-dichloroethane, chlorobenzene, etc. One or more of these compounds may be used either singly or as combined for the solvent. Depending on their type, the monomers to be polymerized could serve as a copolymerization solvent.

The amount of the catalyst to be used for the copolymerization is preferably so controlled that the component (A) may fall generally between 0.1 and 100 $\mu$mols, but preferably between 0.5 and 25 $\mu$mols, in one liter of the solvent, in view of the copolymerization activity and the reactor efficiency.

Regarding the copolymerization condition, the pressure may fall generally between normal pressure and 2000 kg/cm$^2$G (196 MPaG). The reaction temperature may fall generally between −50 and 250° C. For controlling the molecular weight of the polymer to be produced, the type and the amount of the catalyst components to be used and the copolymerization temperature shall be suitably controlled, or hydrogen may be introduced into the copolymerization system.

3. Olefin-Sterene Copolymer The olefin-sterene copolymer by the copolymerization of olefins and styrenes using above mentioned catalyst includes polystyrene, poly (substitutedstyrenes), poly(vinylbenzoate esters) and the mixture of them, or a copolymer comprising them as a main component. Poly(substitutedstyrenes) include poly (hydrocarbon substitutedstyrenes) such as poly (methylstyrene), poly(ethylstyrene), poly(isopropylstyrene), poly(tert-butylstyrene), poly(phenylstyrene), poly (vinylstyrene) etc; poly(hologen substitutedstyrenes) such as poly(chlorostyrene), poly(bromostyrene), poly (fluorostyrene) etc; poly(alkoxystyrenes) such as poly (methoxystyrene), poly(ethoxystyrene) etc. Preferable olefin-sterenic copolymers are polystyrene, poly(p-methylstyrene), poly(m-methylstyrene), poly(p-tertbutylstyrene), poly (p-chlorostyrene),poly (m-chlorostyrene), poly(p-fluorostyrene), a copolymer of styrene and p-tert-buthylstyrene, and a copolymer of styrene and divinylbenzene.

The invention is described in more detail with reference to the following Examples, which, however, are not intended to restrict the scope of the invention.

EXAMPLE 1

(1) Preparation of Component (C):

0.875 ml of 2 M triisobutylaluminium was added to a toluene solution of 455 mg (1.75 mmols) of triphenylmethanol at −78° C., and stirred at room temperature for 24 hours. The concentration of the component (C) thus formed was 0.1 mols/liter.

Through $^1$H-NMR, the product was confirmed to have the component (C) formed therein.

(2) Preparation of Copolymer:

180 ml of toluene, 200 ml of styrene, 1.0 ml of a toluene solution of 1.0 M triisobutylaluminium, 3.5 ml of a toluene solution of 1.43 M methylaluminoxane, and 5 ml of the component (C) prepared in the step (1) were put into a 1.6-liter autoclave equipped with a catalyst feeder tube, in that order, and heated up to 50° C. Next, ethylene was introduced into the autoclave to have a pressure of 0.294 MPaG (3 kg/cm$^2$G). Next, 10.0 μmol of (t-butylamido)dimethyl(tetramethyl-η5-cyclopentadienyl)silane-titanium dichloride dissolved in 20 ml of toluene was put into the autoclave via the catalyst feeder tube. Ethylene was continuously introduced into the autoclave so as to have all the time the constant pressure of 3.0 kg/cm$^2$G (0.294 MPaG), and polymerized for 15 minutes. Next, methanol was added to this to stop the copolymerization. A large amount of methanol was added to this, and the polymer formed was separated through filtration, and then dried at 60° C. under reduced pressure for 4 hours. Thus obtained, the ethylene-styrene copolymer weighed 47.2 g. As measured through GPC-FT/IR, its weight-average molecular weight was 190,000 in terms of polystyrene, and its molecular weight distribution was 2.4. As measured through $^1$H-NMR, the styrene content of the copolymer was 39 mol %. As measured through $^{13}$C-NMR, the structure of random copolymer was identified.

COMPARATIVE EXAMPLE 1

The same process as in Example 1 was repeated, except that the component (C) prepared in the step of Example 1 (1) was not added to the copolymerization system in the step of Example 1 (2). As a result, herein obtained was 30.9 g of ethylene-styrene copolymer. As measured through GPC-FT/IR, its weight-average molecular weight was 200,000 in terms of polystyrene, and its molecular weight distribution was 2.6. As measured through $^1$H-NMR, the styrene content of the copolymer was 37 mol %. As measured through $^{13}$C-NMR, the structure of randomcopolymer was identified.

EXAMPLE 2

170 ml of toluene, 200 ml of styrene, 1.0 ml of a toluene solution of 1.0 M triisobutylaluminium, and 5.0 ml of a ethylbenzene solution of 0.1 M diisobutyl-aluminiumtriphenyl methoxide were put into a 1.6-liter autoclave equipped with a catalyst feeder tube, in that order, and heated up to 50° C. Next, ethylene was introduced into the autoclave to have a pressure of 0.294 MPaG (3 kg/cm$^2$G). Next, a soliution where 10.0 μmol of octahydrofluorenyl-titanium trimethoxide and 10 mmol of methylaluminoxane dissolved in 25 ml of toluene was put into the autoclave via the catalyst feeder tube. Ethylene was continuously introduced into the autoclave so as to have all the time the constant pressure of 3.0 kg/cm$^2$G (0.294 MpaG), and copolymerized for 1 hour. Next, methanol was added to this to stop the copolymerization. A large amount of methanol was added to this, and the polymer formed was separated through filtration, and then dried at 60° C. under reduced pressure for 4 hours. Thus obtained, the ethylene-styrene copolymer weighed 16.2 g. As measured through $^1$H-NMR, the styrene content of the copolymer was 99 mol %. As measured through $^{13}$C-NMR, the structure of randomcopolymer was identified.

COMPARATIVE EXAMPLE 2

175 ml of toluene, 200 ml of styrene, 1.0 ml of a toluene solution of 1.0 M triisobutylaluminium were put into a 1.6-liter autoclave equipped with a catalyst feeder tube, in that order, and heated up to 50° C. Next, ethylene was introduced into the autoclave to have a pressure of 0.294 MPaG (3 kg/cm$^2$G). Next, a soliution where 10.0 μmol of octahydrofluorenyl-titanium trimethoxide and 10 mmol of methylaluminoxane dissolved in 25 ml of toluene was put into the autoclave via the catalyst feeder tube. Ethylene was continuously introduced into the autoclave so as to have all the time the constant pressure of 3.0 kg/cm$^2$G (0.294 MpaG), and copolymerized for 1 hour. Next, methanol was added to this to stop the copolymerization. A large amount of methanol was added to this, and the polymer formed was separated through filtration, and then dried at 60° C. under reduced pressure for 4 hours. Thus obtained, the ethylene-styrene copolymer weighed 6.7 g. As measured through $^1$H-NMR, the styrene content of the copolymer was 99 mol %.

EXAMPLE 3

165 ml of toluene, 200 ml of styrene, 1.0 ml of a toluene solution of 1.0 M triisobutylaluminium, and 5.0 ml of a ethylbenzene solution of 0.1 M diisobutyl-aluminium triphenyl methoxide were put into a 1.6-liter autoclave equipped with a catalyst feeder tube, in that order, and heated up to 50° C. Next, ethylene was introduced into the autoclave to have a pressure of 0.294 MPaG (3 kg/cm$^2$G). Next, a soliution where 10.0 μmol of N,N-dimethylamino-ethyltetramethyl cyclopentadienyl-titanium dichloride and 10 mmol of methylaluminoxane dissolved in 25 ml of toluene was put into the autoclave via the catalyst feeder tube. Ethylene was continuously introduced into the autoclave so as to have all the time the constant pressure of 3.0 kg cm$^2$G (0.294 MpaG), and copolymerized for 1 hour. Next, methanol was added to this to stop the copolymerization. A large amount of methanol was added to this, and the polymer formed was separated through filtration, and then dried at 60° C. under reduced pressure for 4 hours. Thus obtained, the ethylene-styrene copolymer weighed 4.6 g.

COMPARATIVE EXAMPLE 3

175 ml of toluene, 200 ml of styrene, 1.0 ml of a toluene solution of 1.0 M triisobutylaluminium were put into a 1.6-liter autoclave equipped with a catalyst feeder tube, in that order, and heated up to 50° C. Next, ethylene was introduced into the autoclave to have a pressure of 0.294 MPaG (3 kg/cm$^2$G). Next, a soliution where 10.0 μmol of N,N-dimethylamino-ethyltetramethylcyclopentadienyl-titanium dichloride and 10 mmol of methylaluminoxane dissolved in 25 ml of toluene was put into the autoclave via the catalyst feeder tube. Ethylene was continuously introduced into the autoclave so as to have all the time the constant pressure of 3.0 kg/cm²G (0.294 MpaG), and copolymerized for 1 hour. Next, methanol was added to this to stop the copolymerization. A large amount of methanol was added to this, and the polymer formed was separated through filtration, and then dried at 600C under reduced pressure for 4 hours. Thus obtained, the ethylene-styrene copolymer weighed 1.7 g.

INDUSTRIAL APPLICABILITY

Using catalysts of the invention, olefin-styrene copolymers can be produced efficiently and inexpensively.

What is claimed is:

1. A catalyst for copolymerization of olefins and styrenes, which comprises:

(A) a transition metal compound represented by any of the following general formulae (2) to (6):

$$Q^1{}_a(C_5H_{5-a-b}R^8{}_b)(C_5H_{5-a-c}R^9{}_c)M^1X^1Y^1 \qquad (2)$$

$$Q^2{}_a(C_5H_{5-a-d}R^{10}{}_d) Z^1M^1X^1Y^1 \qquad (3)$$

$$(C_5H_5,R^{11}{}_e) M^1X^1Y^1W^1 \qquad (4)$$

$$M^1X^1Y^1W^1U^1 \qquad (5)$$

$$L^1L^2M^2X^1Y^1 \qquad (6)$$

in which $Q^1$ represents a bonding group that crosslinks the two conjugated five-membered cyclic ligands $(C_5H_{5-a-b}R^8{}_b)$ and $(C_5H_{5-a-c}R^9{}_c)$; $Q^2$ represents a bonding group that crosslinks the conjugated five-membered cyclic ligand $(C_5H_{5-a-d}R^{10}{}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a–2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $Z^1$, $W^1$ and $U^1$ may be bonded to each other to form a cyclic structure, (B) an oxygen-containing compound represented by any of the following general formulae (8) to (9):

$$R^{21}-(Y^2-O)_a-(Y^3-O)_b-Y^4-R^{25} \qquad (8)$$

with substituents $R^{22}$, $R^{23}$, $R^{24}$ above $$-(Y^5-O)_c-(Y^6-O)_d- \qquad (9)$$

with substituents $R^{26}$, $R^{27}$ above, forming a ring wherein $R^{21}$ to $R^{27}$ each represent an alkyl group having from 1 to 8 carbon atoms and may be the same or different, and $R^{26}$ and $R^{2'}$ may be the same or different. $Y^2$ to $Y^6$ each represent an element of Group 13 of the Periodic Table, $Y^2$ to $Y^4$ may be the same or different; and $Y^5$ and $Y^6$ may be the same or different, a to d each indicates a number of from 0 to 50, but (a+b) and (c+d) each must be at least 1, (C) a compound of a general formula (1):

$$((R^1)_3-X-Y)n-Z-(R^2)m-n \qquad (1)$$

wherein $R^1$ a phenyl group; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m-1), and optionally, (D) an alkylating agent represented by any of the following general formulae (12) to (14):

$$R^{31}{}_mAl(OR^{32})_nX_{3-m-n} \qquad (12)$$

$$R^{31}{}_2Mg \qquad (13)$$

$$R^{31}{}_2Zn \qquad (14)$$

wherein $R^{31}$ and $R^{32}$ each represent an alkyl group having from 1 to 8 carbon atoms; X represents a hydrogen atom or a halogen atom, $0<m\leq3$, $0\leq n<3$.

2. A catalyst for copolymerization of olefins and styrenes, which comprises:

(A) a transition metal compound, (C) a compound of a general formula (1):

$$((R^1)_3-X-Y)n-Z-(R^2)m-n \qquad (1)$$

wherein $R^1$ represents a phenyl group; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m-1), and optionally, (D) an alkylating agent.

3. The catalyst as claimed in claim 1 for copolymerization of olefins and styrenes, wherein, in (C), X is carbon, Y is oxygen and Z is aluminium.

4. The catalyst as claimed in claim 1 for copolymerization of olefins and styrenes, wherein the compound (C) is a reaction product of <1>at least one selected from compounds of a general formula, $(R^1)_3$—C—$OR^3$, $R^4$—CO—$R^5$ or $R^6$—CO—$OR^7$, with <2>a compound of a general formula, Z $(R^2)$m, wherein $R^1$ represents a phenyl group, $R^3$, $R^4$, $R^5$, $R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and [[$R^1$,]] $R^3$, $R^4$, $R^5$, $R^6$ and $R^7$ may be the same or different, and [[$R^1$,]] $R^3$, $R^4$, $R^5$, $R^6$ and $R^7$ may be optionally bonded to each other to form a cyclic structure; Z represents a metal element of Groups 2 to 13; m is an integer, indicating the valency of the metal element Z; and $R^2$ represents a hydrocarbon group.

5. A catalyst for copolymerization of olefins and styrenes, which comprises:
  (A) a transition metal compound,
  (B) an oxygen-containing compound, and/or a compound capable of reacting with a transition metal compound to form an ionic complex,
  (C1) at least one selected from compounds of a general formula, $(R^1)_3$—C—$OR^3$, $R^4$—CO—$R^5$ or $R^6$-CO—$OR^7$ (In these formulae, $R^1$ represents a phenyl group $R^3$, $R^4$, $R^5$, $R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and $[R^1]$ $R^3$, $R^4$, $R^5$, $R^6$ and $R^7$ may be the same different, and $[R^1]$ $R^3$, $R^4$, $R^5$, $R^6$ and $R^7$ may be optionally bonded to each other to form a cyclic structure,)
  (C2) a compound of a general formula, $Z(R^2)m$. (In this formula; Z represents a metal element of Groups 2 to 13; m is an integer, indicating the valency of the metal element Z; and $R^2$ represents a hydrocarbon group, and optionally,
  (D) an alkylating agent.

6. A catalyst for copolymerization of olefins and styrenes, which comprises:
  (A) a transition metal compound,
  (C1) at least one selected from compounds of a general formula, $(R^1)_3$—C—$OR^3$, $R^4$—CO—$R^5$ or $R^6$—CO—$OR^7$ (In these formulae, $R^1$ represents a phenyl group, $R^3$, $R^4$, $R^5$, $R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an thioaryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, and $[R^1]$ $R^3$, $R^4$, $R^5$, $R^6$ and $R^7$ may be the same or different, and $[R^1]$ $R^3$'$R$', $R^4$, $R$, $R^6$ and $R^7$ maybe optionally bonded to each other to form a cyclic structure,
  (C2) a compound of a general formula, $Z(R^2)_m$, wherein Z represents a metal element of Groups 2 to 13; m is a integer, indicating the valency of the metal element Z; and $R^2$ represents a hydrocarbon group,
  and optionally,
  (D) an alkylating agent.

7. The catalyst as claimed in claim 1 for copolymerization of olefins and styrenes, wherein $R^2$ is an alkyl group having at least 2 carbon atoms.

8. The catalyst as claimed in claim 4 for copolymerization of olefins and styrenes, wherein Z is aluminium.

9. The catalyst as clamed in claim 1 for copolymerization of olefins and styrenes, wherein, in the transition metal compound (A) of formula (4), the group $(C_5H_{5-e}R^{11}_e)$ is represented by any of the following general formulae (I) to (VII):

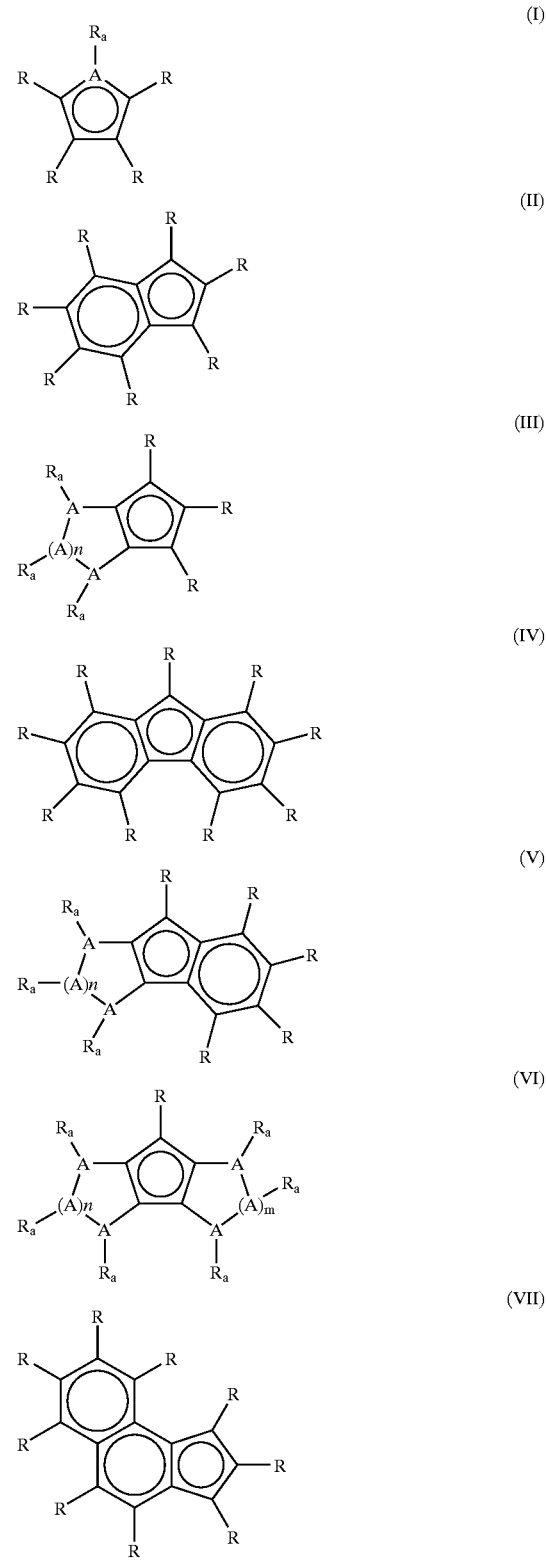

wherein A represents an element of Group 13, 14, 15 or 16, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

10. A method for producing olefin-styrene copolymers, which comprises polymerizing olefins and styrenes in the presence of the copolymerization catalyst of claim 1.

11. The catalyst as claimed in claim 2 for copolymerization of olefins and styrenes, wherein, in (C), X is carbon, Y is oxygen and Z is aluminium.

12. The catalyst as claimed in claim 2 for copolymerization of olefins and styrenes, wherein the compound (C) is a reaction product of <1>at least one selected from compounds of a general formula, $(R^1)_3$—C—$OR^3$, $R^4$—CO—R or $R^6$—CO—$OR^7$, with <2>a compound of a general formula, $Z(R^2)_m$. (In these formulae, $R^1$ represents a phenyl group, $R^3$, $R^4$, $R^5$, $R^6$ and $R^7$ each represent a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, an [$R^1$] $R^3$, $R^4$, $R^5$, $R^6$ and $R^7$ may be the same or different, and [$R^1$] $R^3$, $R^4$, $R^5$, $R^6$ and $R^7$ may be optionally bonded to each other to form a cyclic structure; Z represents a metal element of Groups 2 to 13; m is an integer, indicating the valency of the metal element Z; and $R^2$ represents a hydrocarbon group).

13. The catalyst as claimed in claim 2 for copolymerization of olefins and styrenes, wherein $R^2$ is an alkyl group having at least 2 carbon atoms.

14. The catalyst as claimed in claim 5 for copolymerization of olefins and styrenes, wherein $R^2$ is an alkyl group having at least 2 carbon atoms.

15. The catalyst as claimed in claim 6 for copolymerization of olefins and styrenes, wherein $R^2$ is an alkyl group having at least 2 carbon atoms.

16. The catalyst as claimed in claim 5 for copolymerization of olefins and styrenes, wherein Z is aluminium.

17. The catalyst as claimed in claim 6 for copolymerization of olefins and styrenes, wherein Z is aluminium.

18. The catalyst as claimed in claim 2 for copolymerization of olefins and styrenes, wherein the transition metal compound (A) is represented by any of the following general formulae (2) to (6):

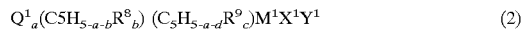  (2)

  (3)

  (4)

  (5)

  (6)

in which $Q^1$ represents a bonding group that crosslinks the two conjugated five-membered cyclic ligands ($C_5H_{5-a-b}R^8{}_b$) and ($C_5H_{5-a-c}R^9{}_c$); $Q^2$ represents a bonding group that crosslinks the conjugated five-membered cyclic ligand ($C_5H_{5-a-d}R^{10}{}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; c is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^2$, $L^2$, $X^1$, $Y^1$, $Z^1$, $W^1$ and $U^1$ may be bonded to each other to form a cyclic structure.

19. The catalyst as claimed in claim 5 for copolymerization of olefins and styrenes, wherein the transition metal compound (A) is represented by any of the following general formulae (2) to (6):

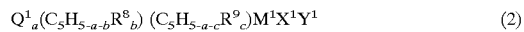  (2)

  (3)

  (4)

  (5)

  (6)

in which $Q^1$ represents a bonding group that crosslinks the two conjugated five-membered cyclic ligands ($C_5H_{5-a-b}R^8{}_b$) and ($C_5H_{5-a-c}R^9{}_c$); $Q^2$ represents a bonding group that crosslinks the conjugated five-membered cyclic ligand ($C_5H_{5-a-d}R^{10}{}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $Z^1$, $W^1$ and $U^1$ may be bonded to each other to form a cyclic structure.

20. The catalyst as claimed in claim 6 for copolymerization of olefins and styrenes, wherein the transition metal compound (A) is represented by any of the following general formulae (2) to (6):

  (2)

  (3)

  (4)

  (5)

  (6)

in which $Q^1$ represents a bonding group that crosslinks the two conjugated five-membered cyclic ligands ($C5H_{5-a-b}R^8{}_b$) and ($C5H_{5-a-c}R^9{}_c$); $Q^2$ represents a bonding group that crosslinks the conjugated five-membered cyclic ligand ($C_5H_{5a-d}R^{10}{}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to S; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $Z^1$, $W^1$ and $U^1$ may be bonded to each other to form a cyclic structure.

21. The catalyst as claimed in claim 2 for copolymerization of olefins and styrenes, wherein, in the transition metal compound (A) of formula (4), the group ($C_5H_5R^{11}$) is represented by any of the following general formulae (1) to (VII):

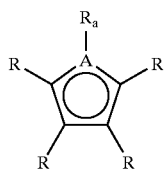
(I)

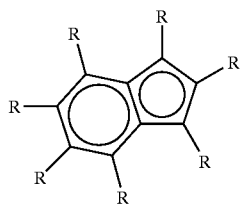
(II)

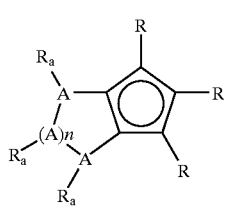
(III)

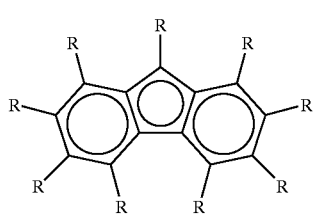
(IV)

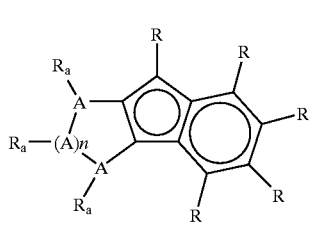
(V)

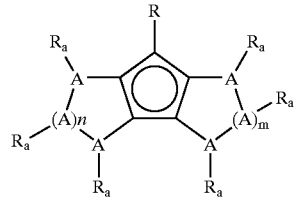
(VI)

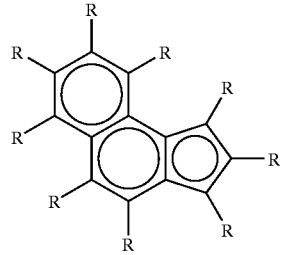
(VII)

wherein A represents an element of Group 13, 14, 15 or 16, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

22. The catalyst as claimed in claim 5 for copolymerization of olefins and styrenes, wherein, in the transition metal compound (A) of formula (4), the group ($C_{5-e}H_5R^{11}_e$) is represented by any of the following general formulae (1) to (VII):

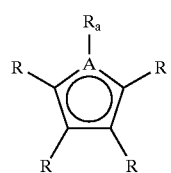
(I)

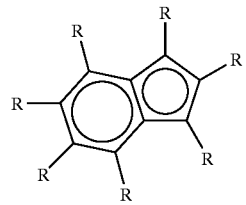
(II)

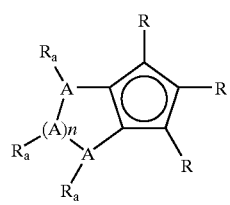
(III)

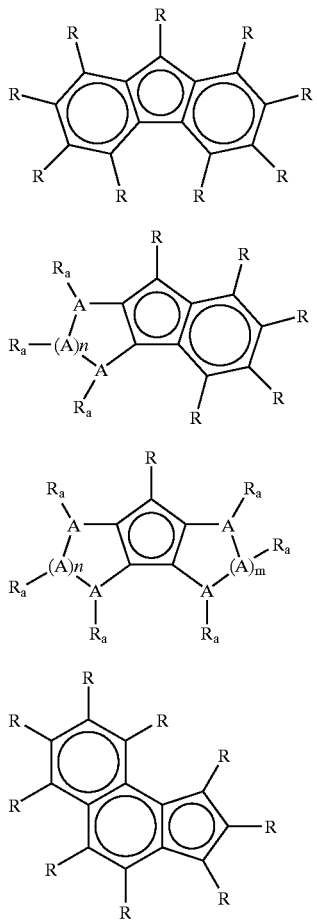

wherein A represents an element of Group 13, 14, 15 or 16, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

23. The catalyst as claimed in claim 6 for copolymerization of olefins and styrenes, wherein, in the transition metal compound (A) of formula (4), the group $(C_5H_{5-e}R^{11}_e)$ is represented by any of the following general formulae (I) to (VII):

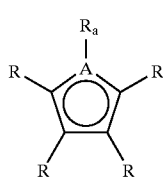 (I)

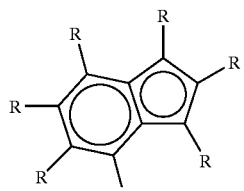 (II)

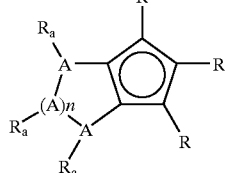 (III)

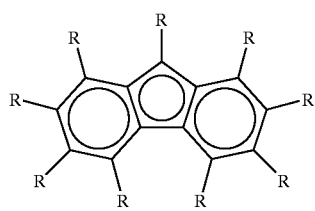 (IV)

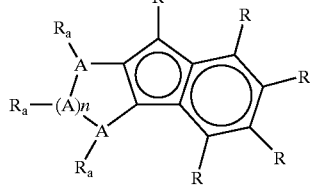 (V)

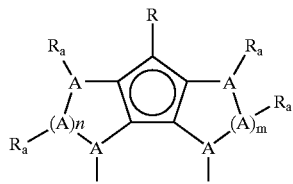 (VI)

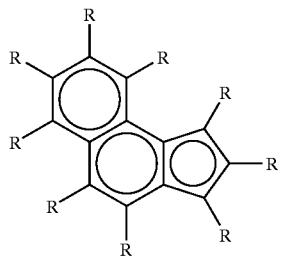 (VII)

wherein A represents an element of Group 13, 14, 15 or 16, and plural A's may be the same or different; K represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

24. A method for producing olefin-styrene copolymers, which comprises polymerizing olefins and styrenes in the presence of the copolymerization catalyst of claim 2.

25. A method for producing olefin-styrene copolymers, which comprises polymerizing olefins and styrenes in the presence of the copolymerization catalyst of claim 5.

26. A method for producing olefin-styrene copolymers, which comprises polymerizing olefins and styrenes in the presence of the copolymerization catalyst of claim 6.

* * * * *